United States Patent [19]

Alt et al.

[11] 3,993,038

[45] Nov. 23, 1976

[54] SYSTEM FOR PREVENTING DRIVE TRAIN START OF A MOTOR VEHICLE INTERNAL COMBUSTION ENGINE

[75] Inventors: Robert D. Alt, Warren; Charles H. Huebner, Royal Oak, both of Mich.

[73] Assignee: General Motors Corporation, Detroit, Mich.

[22] Filed: Aug. 29, 1975

[21] Appl. No.: 609,018

[52] U.S. Cl. ............... 123/198 DB; 123/139 AV; 123/179 G; 123/198 D; 180/103 R
[51] Int. Cl.² ..................................... F02B 77/08
[58] Field of Search ........ 123/179 R, 179 G, 198 D, 123/198 DB, 198 DL, 139 AV; 180/82 R, 103 R, 103 BF

[56] References Cited
UNITED STATES PATENTS

| | | | |
|---|---|---|---|
| 3,763,397 | 10/1973 | Yockers | 123/198 D |
| 3,897,771 | 8/1975 | Stumpp | 123/198 DB |
| 3,916,865 | 11/1975 | Kiencke et al. | 123/198 DB |

Primary Examiner—Wendell E. Burns
Assistant Examiner—David D. Reynolds
Attorney, Agent, or Firm—Richard G. Stahr

[57] ABSTRACT

A solenoid operated valve is installed in the fuel supply line of an internal combustion engine and is effective to interrupt the flow of fuel to the engine while the operating solenoid thereof is energized. A normally closed contact pair of an electrical relay which is energized when the engine is in the normal cranking mode is connected in series in the energizing circuit of the operating solenoid of the solenoid operated valve. A holding circuit for the operating coil of the relay is provided and includes at least a normally open contact pair of the relay and circuitry responsive to the operating mode of the engine effective to interrupt the holding circuit while the engine is in the not running mode.

5 Claims, 1 Drawing Figure

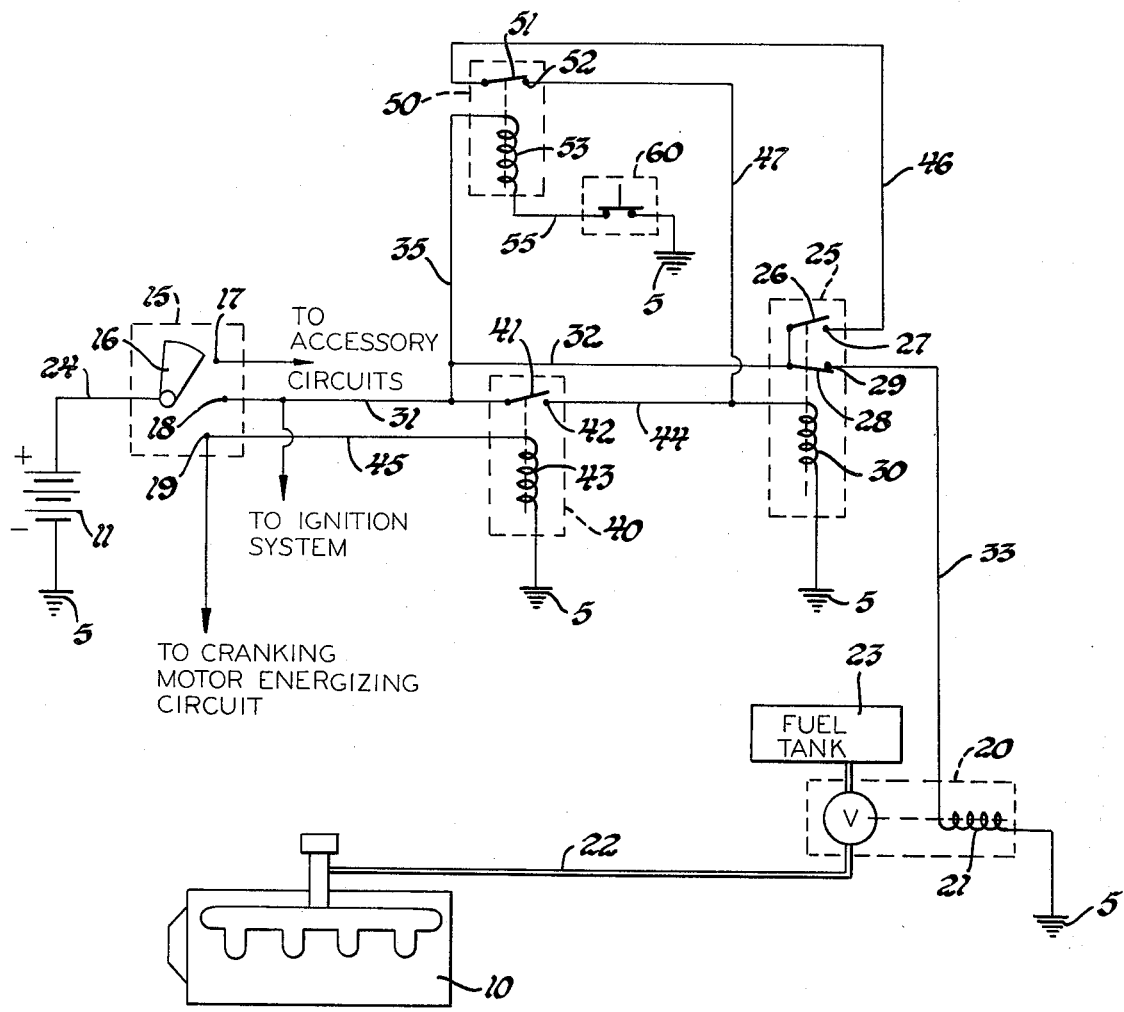

SYSTEM FOR PREVENTING DRIVE TRAIN START OF A MOTOR VEHICLE INTERNAL COMBUSTION ENGINE

This invention is directed to a system for preventing the starting of a motor vehicle internal combustion engine other than by the normal cranking mode.

It has been learned that the emission control devices such as a catalytic converter employed with modern motor vehicles may be severely damaged should the engine thereof be started by methods other than the normal cranking mode. Such damage may occur in the event the motor vehicle is pushed or towed in excess of one-fourth mile. Therefore, a system for preventing the starting of the motor vehicle internal combustion engine by methods other than the normal cranking mode is desirable.

It is, therefore, an object of this invention to provide an improved system for preventing drive train start of a motor vehicle internal combustion engine.

It is another object of this invention to provide an improved system for preventing the starting of an internal combustion engine of a motor vehicle by methods other than the normal cranking mode.

It is an additional object of this invention to provide an improved system for preventing drive train start of the internal combustion engine of a motor vehicle by interrupting the flow of fuel thereto with conditions of engine operation other than the normal running mode after a normal cranking mode start.

In accordance with this invention, a system for preventing drive train start of a motor vehicle internal combustion engine is provided wherein a solenoid operated valve effective to interrupt the flow of fuel to the engine while the operating solenoid thereof is energized is installed in the fuel line and the normally closed contacts of an electrical relay, energizable only when the engine is in the normal cranking mode, is connected in series in the energizing circuit of the operating solenoid of the solenoid operated valve.

For a better understanding of the present invention, together with additional objects, advantages and features thereof, reference is made to the following description and accompanying single FIGURE drawing which sets forth the system for preventing drive train start of a motor vehicle internal combustion engine of this invention in schematic form.

Since point of reference or ground potential is the same point electrically throughout the system, it has been illustrated in the drawing by the accepted schematic symbol and referenced by the numeral 5.

Referring to the drawing, the system for preventing drive train start of a motor vehicle internal combustion engine is set forth in schematic form in combination with an internal combustion engine 10, a source of direct current potential which may be the vehicle's storage battery 11 and a conventional automotive type ignition switch 15.

Ignition switch 15 may be a conventional automotive ignition switch of the type having a movable contact 16 and three stationary contacts 17, 18 and 19. Ignition switches of this type are manually operable, generally with an ignition key, to a "crank" position, at which movable contact 16 is in electrical contact with stationary contacts 18 and 19, and is spring biased to return to the "run" position upon the release of the torque upon the ignition key, at which movable contact 16 is in electrical contact with stationary contacts 17 and 18.

While ignition switch 15 is in the crank position to start the engine through the normal cranking mode, the engine cranking motor energizing circuit, not shown, is connected across battery 11, through movable contact 16 and stationary contact 19 and the ignition system circuit, not shown, is connected across battery 11 through movable contact 16 and stationary contact 18. While ignition switch 15 is in the run position, the associated accessory circuits are connected across battery 11 through movable contact 16 and stationary contact 17 and the ignition system circuit is connected across battery 11 through movable contact and stationary contact 18. While ignition switch 15 is maintained in the run position after a normal cranking mode start, engine 10 remains in the normal running mode.

A solenoid operated valve 20 having an operating solenoid 21 is installed in fuel line 22 extending between the fuel tank 23 and engine 10. Solenoid operated valve 20 may be any one of the many solenoid valves well known in the art, it being only necessary that it be of the type effective to interrupt the flow of fuel to engine 10 while the operating solenoid 21 thereof is energized. An electrically energizable energizing circuit for operating solenoid 21 of solenoid operated valve 20 may be traced from the positive polarity terminal of battery 11, through lead 24, movable contact 16 and stationary contact 18 of ignition switch 15 when in the run position, leads 31 and 32, the normally closed contact pair, movable contact 28 and stationary contact 29, of fuel supply control relay 25, lead 33, operating solenoid 21 of solenoid operated valve 20 and point of reference or ground potential 5 to the negative polarity terminal of battery 11.

An electrically energizable energizing circuit for operating coil 30 of fuel supply control relay 25 while engine 10 is in the normal cranking mode may be traced from the positive polarity terminal of battery 11, through lead 24, movable contact 16 and stationary contact 18 of ignition switch 15 when in the crank position, lead 31, the normally open contact pair, movable contact 41 and stationary contact 42, of engine cranking mode sensing relay 40, lead 44, operating coil 30 of fuel supply control relay 25 and point of reference or ground potential 5 to the negative polarity terminal of battery 11. An electrically energizable energizing circuit for operating coil 43 of engine cranking mode sensing relay 40 while engine 10 is in the normal cranking mode may be traced from the positive polarity terminal of battery 11, through lead 24, movable contact 16 and stationary contact 19 of ignition switch 15 when in the crank position, lead 45, operating coil 43 of engine cranking mode sensing relay 40 and point of reference or ground potential 5 to the negative polarity terminal of battery 11. The operation of ignition switch 15 to the crank position, therefore, is effective to establish the energizing circuit for operating coil 43 of cranking mode sensing relay 40 and the closing of the normally closed contact pair 41-42 of cranking mode sensing relay 40 and movable contact 16 and stationary contact 18 of ignition switch 15 when in the crank position in series therewith are effective to establish the energizing circuit for operating coil 30 of fuel supply control relay 25. An electrically energizable holding circuit for operating coil 30 of fuel supply control relay 25 including the normally open contact pair thereof, movable contact 26 and stationary contact 27, and circuitry responsive to the operating mode of engine 10 effective to interrupt the holding circuit while engine 10 is in the not running mode is provided. This holding circuit may be traced from the positive polarity terminal of battery 11, through lead 24, movable contact 16 and stationary contact 18 of ignition switch 15 when in the run or crank positions, leads 31 and 32, the normally open contact pair 26–27 of fuel supply control relay 25, lead 46, the normally closed contact pair, movable contact 51 and stationary contact 52, of engine operating mode sensing relay 50, lead 47, operating coil 30 of fuel supply control relay 25 and point of reference or ground potential 5 to the negative polarity terminal of battery 11. The electrically energizable energizing circuit for operating coil 53 of engine operating mode sensing relay 50 includes electric circuit switching means effective to establish and interrupt this energizing circuit while engine 10 is in the not running mode and in the running mode, respectively. This energizing circuit may be traced from the positive polarity terminal of battery 11, through lead 24, movable contact 16 and stationary contact 18 of ignition switch 15 while in the run or crank positions, leads 31 and 35, operating coil 53 of engine operating mode sensing relay 50, lead 55, normally closed electrical switch 60 and point of reference or ground potential 5 to the negative polarity terminal of battery 11. Electrical switch 60 may be any normally closed electrical switching device sensitive to the operation of motor 10 while in the running mode to be operated to the electrical circuit open condition. In a preferred embodiment, electrical switch 60 was a conventional automotive type oil pressure switch having normally closed contacts while the engine is in the not running mode which are operated to the electrical circuit open condition while the engine is in the running mode, in a manner well known in the automotive art. Engine operating mode sensing relay 50, therefore, is responsive to the operating mode of engine 10 and is effective to interrupt the fuel supply control relay 25 holding circuit while engine 10 is in the not running mode.

The operation of ignition switch 15 to the run position while engine 10 is in the not running mode does not establish the energizing circuit for operating coil 43 of engine cranking mode sensing relay 40, consequently, the normally open contact pair 41–42 thereof remains open. The open contact pair 41–42 of engine cranking mode sensing relay 40 interrupt the energizing circuit for operating coil 30 of fuel supply control relay 25, consequently, normally closed contact pair 28–29 thereof remains in the electrical circuit closed condition. The closed contact pair 28–29 establishes the energizing circuit for operating solenoid 21 of solenoid operated valve 20, therefore, solenoid operated valve 20 interrupts the flow of fuel to engine 10. With these conditions, engine 10 cannot be started through the drive train.

The operation of ignition switch 15 to the crank position, in which position movable contact 16 is in electrical circuit engagement with stationary contacts 18 and 19, establishes the energizing circuit for operating coil 43 of engine cranking mode sensing relay 40, consequently, the normally open contact pair 41–42 thereof is operated to the electrical circuit closed condition. The closure of normally open contact pair 41–42, establishes the energizing circuit for operating coil 30 of fuel supply control relay 25, consequently, normally closed contact pair 26–27 of fuel supply control relay 25 is operated to the electrical circuit closed condition and normally closed contact pair 28–29 thereof is operated to the electrical circuit open condition. Upon the operation of normally closed contact pair 28–29 of fuel supply control relay 25 to the electrical circuit open condition, the energizing circuit for operating solenoid 21 of solenoid operated valve 20 is interrupted to deenergize operating solenoid 21. Upon the deenergization of operating solenoid 21, solenoid operated valve 20 permits the flow of fuel to engine 10, consequently, engine 10 may be started through the normal cranking mode. After engine 10 has started, the normally closed contacts of oil pressure switch 60 are operated by oil pressure to the electrical circuit open condition to interrupt the energizing circuit for operating coil 53 of engine operating mode sensing relay 50. Upon the deenergization of this circuit, the normally closed contact pair 51–52 of engine operating mode sensing relay 50 operate to the electrical circuit closed condition to complete the holding circuit for operating coil 30 of fuel supply control relay 25 which may be traced from the positive polarity terminal of battery 11, through lead 24, movable contact 16 and stationary contact 18 of ignition switch 15 which has been returned to the run position upon the start of engine 10, leads 31 and 32, the now closed contact pair 26–27 of fuel control relay 25, lead 46, the normally closed contact pair 51–52 of engine operating mode sensing relay 50, lead 47, operating coil 30 of fuel supply control relay 25 and point of reference or ground potential 5 to the negative polarity terminal of battery 11. Consequently, engine 10 continues to operate in the normal running mode after a normal cranking mode start. While engine 10 is operating in the normal running mode after a normal cranking mode start, the holding circuit for operating coil 30 of fuel supply control relay 25 remains closed, consequently, operating solenoid 21 of solenoid operated valve 20 remains deenergized to permit a normal flow of fuel to engine 10.

Should engine 10 stall after a normal cranking mode start with ignition switch 15 in the run position, the loss of oil pressure permits the normally closed contacts of oil pressure switch 60 to close, a condition which establishes the energizing circuit for operating coil 53 of engine operating mode sensing relay 50. Upon the energization of operating coil 53, the normally closed contact pair 51–52 of engine operating mode sensing relay 50 is operated to the electrical circuit open condition to interrupt the holding circuit for operating coil 30 of fuel supply control relay 25. The interruption of this holding circuit deenergizes operating coil 30, therefore, normally closed contact pair 28–29 of fuel supply control relay close to establish the energizing circuit for operating solenoid 21 of solenoid operated valve 20. The energization of solenoid valve 20 interrupts the flow of fuel to engine 10. Consequently, engine 10 cannot be started with these conditions.

From this description, it is apparent that solenoid operated valve 20 interrupts the flow of fuel to engine 10 at all times other than during and after a normal cranking mode start and after the engine has stalled after a normal cranking mode start, consequently, engine 10 cannot be started by pushing, towing, or coasting down a slope while the transmission is in gear. That is, the novel system of this invention prevents the engine 10 from being started other than by the normal cranking mode.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A system for preventing drive train start of a motor vehicle internal combustion engine, comprising: a solenoid operated valve effective to interrupt the flow of fuel to the engine while the operating solenoid thereof is energized; an electrical switching device having a normally closed contact pair and being of the type responsive to the application of electrical power thereto to operate said contact pair to the electrical circuit open condition; an electrically energizable energizing circuit for said operating solenoid of said solenoid operated valve including at least said normally closed contact pair of said electrical switching device; electric circuit means effective to apply electrical power to said electrical switching device while said engine is in the normal cranking mode; and holding circuit means effective to supply electrical power to said electrical switching device while said engine is operating in the running mode, said holding circuit means including circuit means effective to interrupt said holding circuit means while said engine is in the not-running mode.

2. A system for preventing drive train start of a motor vehicle internal combustion engine, comprising: a solenoid operated valve effective to interrupt the flow of fuel to the engine while the operating solenoid thereof is energized; a relay having an operating coil and normally open and normally closed contact pairs; an electrically energizable energizing circuit for said operating solenoid of said solenoid operated valve including at least said normally closed contact pair of said relay; electric circuit means effective to establish an electrically energizable energizing circuit for said operating coil of said relay while said engine is in the normal cranking mode; and an electrically energizable holding circuit for said operating coil of said relay including at least said normally open contact pair thereof and circuit means effective to interrupt said holding circuit while said engine is in the not-running mode.

3. A system for preventing drive train start of a motor vehicle internal combustion engine, comprising: a solenoid operated valve effective to interrupt the flow of fuel to the engine while the operating solenoid thereof is energized; a fuel supply control relay having an operating coil and normally open and normally closed contact pairs; an engine cranking mode sensing relay having an operating coil and a normally open contact pair; an electrically energizable energizing circuit for said operating solenoid of said solenoid operated valve including at least said normally closed contact pair of said fuel supply control relay; an electrically energizable energizing circuit for said operating coil of said fuel supply control relay including at least said normally open contact pair of said engine cranking mode sensing relay; an electrically energizable energizing circuit for said operating coil of said engine cranking mode sensing relay while said engine is being cranked in a normal manner; and an electrically energizable holding circuit for said operating coil of said fuel supply control relay including at least said normally open contact pair thereof and circuit means responsive to the operating mode of said engine effective to interrupt said holding circuit while said engine is in the not-running mode.

4. A system for preventing drive train start of a motor vehicle internal combustion engine, comprising: a solenoid operated valve effective to interrupt the flow of fuel to the engine while the operating solenoid thereof is energized; a fuel supply control relay having an operating coil and normally open and normally closed contact pairs; an engine operating mode sensing relay having an operating coil and a normally closed contact pair; an electrically energizable energizing circuit for said operating solenoid of said solenoid operated valve including at least said normally closed contact pair of said fuel supply control relay; electric circuit means effective to establish an electrically energizable energizing circuit for said operating coil of said fuel supply control relay while said engine is in the normal cranking mode; an electrically energizable energizing circuit for said operating coil of said engine operating mode sensing relay including electric circuit switching means effective to establish and to interrupt this energizing circuit while said engine is in the not-running mode and in the running mode, respectively; and an electrically energizable holding circuit for said operating coil of said fuel supply control relay including at least said normally closed contact pair thereof and said normally closed contact pair of said engine operating mode sensing relay in series whereby said normally closed contact pair of said engine operating mode sensing relay is effective to interrupt said holding circuit while said engine is in the not-running mode.

5. A system for preventing drive train start of a motor vehicle internal combustion engine, comprising: a solenoid operated valve effective to interrupt the flow of fuel to the engine while the operating solenoid thereof is energized; a fuel supply control relay having an operating coil and normally open and normally closed contact pairs; an engine cranking mode sensing relay having an operating coil and a normally open contact pair; an engine operating mode sensing relay having an operating coil and a normally closed contact pair; an electrically energizable energizing circuit for said operating solenoid of said solenoid operated valve including at least said normally closed contact pair of said fuel supply control relay; electric circuit means effective to establish an electrically energizable energizing circuit for said operating coil of said engine cranking mode sensing relay while said engine is in the normal cranking mode; an electrically energizable energizing circuit for said operating coil of said fuel supply control relay including at least said normally open contact pair of said engine cranking mode sensing relay; an electrically energizable energizing circuit for said operating coil of said engine operating mode sensing relay including electric circuit switching means effective to establish and to interrupt this energizing circuit while said engine is in the not-running mode and in the running mode, respectively; and an electrically energizable holding circuit for said operating coil of said fuel supply control relay including at least said normally open contact pair thereof and said normally closed contact pair of said engine operating mode sensing relay in series whereby said normally closed contact pair of said engine operating mode sensing relay is effective to interrupt said holding circuit while said engine is in the not-running mode.

* * * * *